United States Patent [19]
Alexander et al.

[11] Patent Number: 6,134,593
[45] Date of Patent: Oct. 17, 2000

[54] AUTOMATED METHOD FOR ELECTRONIC SOFTWARE DISTRIBUTION

[75] Inventors: Marc A. Alexander, Clackamas; Gerald B. Feldkamp; Bernard R Strathern, both of Beaverton, all of Oreg.

[73] Assignee: CCComplete, Inc., Portland, Oreg.

[21] Appl. No.: 08/941,643

[22] Filed: Sep. 30, 1997

[51] Int. Cl.[7] .......................... G06F 15/16; G06F 15/173
[52] U.S. Cl. .................. 709/229; 709/225; 709/219; 709/300; 705/54; 705/44; 705/26; 705/39; 717/11; 713/200; 713/201; 713/202
[58] Field of Search ..................... 709/229, 300, 709/219; 714/48, 38, 25, 35, 200; 370/261; 705/54, 55, 18, 26; 713/159, 165, 200; 340/825.31; 380/23

[56] References Cited

U.S. PATENT DOCUMENTS

| | | | |
|---|---|---|---|
| 4,658,093 | 4/1987 | Hellman | 705/52 |
| 5,319,705 | 6/1994 | Halter et al. | 705/54 |
| 5,337,357 | 8/1994 | Chou et al. | 705/56 |
| 5,375,206 | 12/1994 | Hunter et al. | 395/200 |
| 5,490,216 | 2/1996 | Richardson, III | 705/59 |
| 5,652,793 | 7/1997 | Priem et al. | 380/4 |
| 5,809,144 | 9/1998 | Sirbu et al. | 705/52 |
| 5,835,911 | 11/1998 | Nakagawa et al. | 707/203 |
| 5,898,777 | 4/1999 | Tycksen et al. | 380/4 |

*Primary Examiner*—Mark H. Rinehart
*Assistant Examiner*—Beatriz Prieto
*Attorney, Agent, or Firm*—Blakely Sokoloff Taylor & Zafman, LLP

[57] ABSTRACT

A method for a user to automatically order, unlock and pay for a vendor software application via an automated telephony and/or Internet system. The user requests access to a vendor software application. If access is not allowed, the user transmits a computing device identifier identifying the computing device on which the vendor software application is executing, a vendor software product distribution identifier, and a vendor identifier to a aserver. Pricing data is provided to the user, and payment for the vendor software application is processed before access is granted thereto. After payment processing, the server then transmits a password to the client based on the identifiers. Thereafter, the user enters the password to gain access to and execute the vendor software application to which access was previously denied.

17 Claims, 4 Drawing Sheets

AUTOMATED METHOD FOR ELECTRONIC SOFTWARE DISTRIBUTION

CROSS REFERENCE TO RELATED APPLICATIONS

Not applicable.

STATEMENT REGARDING FEDERALLY SPONSORED RESEARCH OR DEVELOPMENT

Not Applicable.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to the field of electronic software distribution. In particular, the present invention is related to an automated method for software unlocking and payment processing to allow execution of the software by a user on a client computing system in a client-server computing environment.

2. Description of the Related Art

Sales of products and services traditionally have been transacted by sales people or agents. More recently, sales of products and services, in particular high technology products, including software products, have been transacted by a combination of sales people and electronic delivery and/or payment systems. Consumers today increasingly expect immediate access to products, services and information, via telecommunications-, intranet-, Internet-, cable-, and satellite-based commerce systems or combinations thereof.

Telecommunications technology including predictive dialers, automated call management systems and database management technology has enabled "teleservice" to become a more cost-effective way of reaching consumers. Inbound teleservice activity, often in a customer service application, is growing rapidly, placing demands on corporate staffing requirements to handle increased call loads while providing faster delivery of products, services, and information to the consumer.

Moreover, communications between customers and vendors are labor intensive with telephone service representatives providing the primary link between a vendor and its customers. The representatives are responsible for a customer's impressions. Although labor often represents a high percentage of vendor's costs, most vendors under-invest in their employees and have both high turnover and a high percentage of part-time employees.

To increase cost-effectiveness, what is needed is an automated inbound, non-operator intervention call-handling system, capable of operating 24 hours a day, seven days a week, via which consumers can order products and services or obtain information without interaction with telephone service representatives. Automation provides the vendor with the opportunity to segment customers into those who can purchase products or services, or have their issues resolved automatically, and those who need personal attention that can be provided by fewer, better skilled, and higher paid telephone service representatives. In particular, what is needed is an automated system via which consumers can order software products without interaction with telephone service representatives.

BRIEF SUMMARY OF THE INVENTION

A method is disclosed for a user to automatically order, unlock and pay for a software application from a vendor via a computer-automated telephony and/or Internet ordering system in a client-server computing environment. The user, proximate to the client device, requests access to at least a portion of a vendor software application generally via the application itself. If access is not allowed, the user transmits product distribution and installation identifiers to a server. The server processes the identifiers and transmits a password to the user based thereon, wherein the user enters the password at the client to gain access to and execute that portion of the vendor software application to which access was previously denied. The method also provides for processing payment for the vendor software application before access is granted thereto.

BRIEF DESCRIPTION OF THE SEVERAL VIEWS OF THE DRAWINGS

The present invention is illustrated by way of example and not limitation in the following figures. Like references indicate similar elements, in which.

DETAILED DESCRIPTION OF THE INVENTION

The present invention is related to an automated method for software unlocking and payment processing to allow execution of the software by a user on a client computing system in a client-server computing environment. In the following description, numerous specific details are set forth in order to provide a thorough understanding of the present invention. It will be apparent, however, to one of ordinary skill in the art that the present invention may be practiced without these specific details. In other instances, well-known systems, architectures, and techniques have not been shown to avoid unnecessarily obscuring the present invention.

Figure 1:
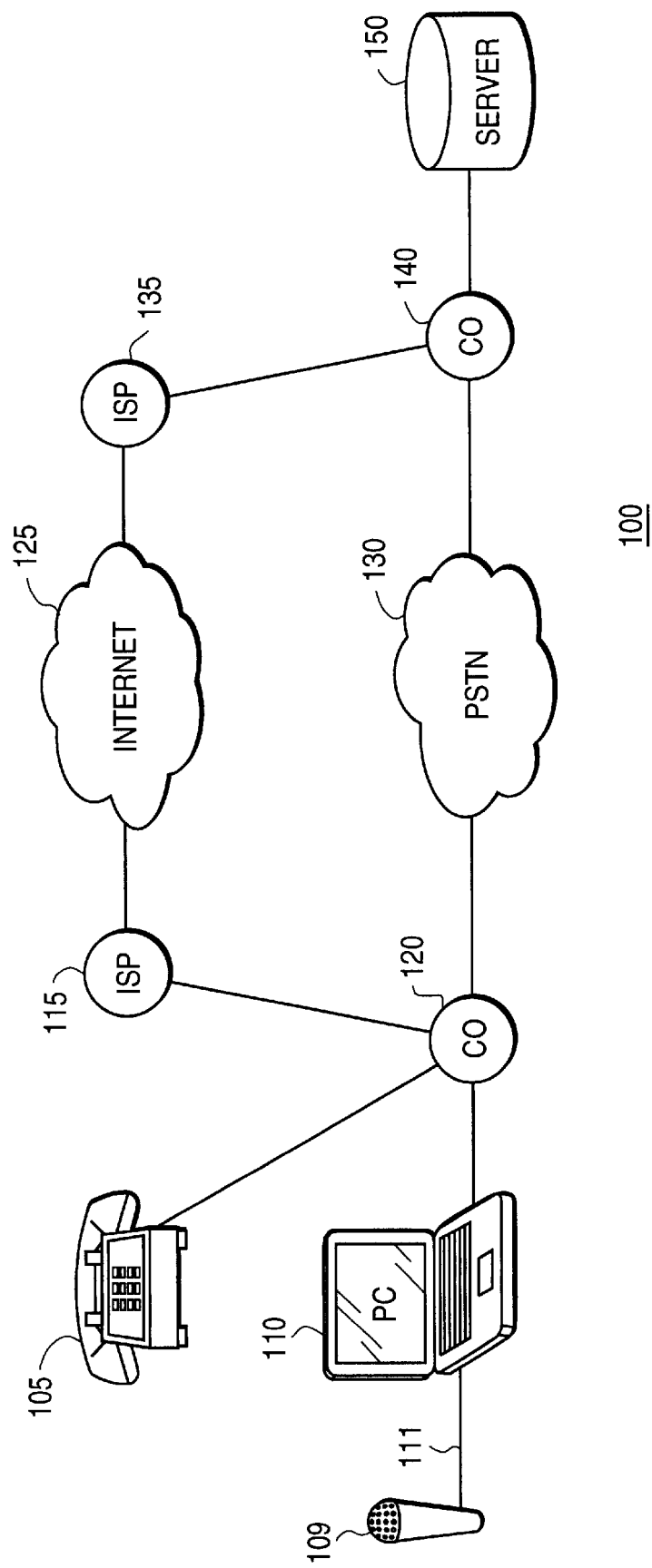
FIG. 1 is a block diagram of client-server computing environment in which an embodiment of the present invention may be utilized.

With reference to FIG. 1, a client-server computing environment 100 as may be utilized by an embodiment of the present invention is illustrated. A client computing device 110, or simply, client 110, e.g., a Personal Computer (PC), is capable of communicating with a server 150, either by way of the Public Switched Telephone Network (PSTN) 130 or Internet 125. Additionally, a user of the client may communicate with server 150 via telephone 105, for example, to configure client 110 by selecting options via keypad entry on the telephone which cause server 150 to communicate parameters to client 110 necessary for desired configuration and operation of client 110.

In alternative embodiments, client 110 may be a host, workstation, network device, personal digital assistant, mobile computer, or other general or special purpose computing device executing a general or special purpose operating system and one or more software applications. In the illustration, client 110 accesses PSTN 130 via a local loop 111 to Central Office (CO) 120. Client 110 may include an internal modem or be associated with an external modem necessary for communication over local loop 111, which may transmit voice and/or data in analog or digital format. An internal or external microphone 109 is connected to client 110 to provide a means for voice input to client 110, which in turn, processes the voice input and communicates, as appropriate, with the server based on the input. Client 110 also accesses the Internet 125 via Internet Service Provider 115. Other systems for communicating between client and server not shown include wireless communications, e.g., radio, cellular radio or satellite communications. Server 150 may also be a host, workstation or network device, or other general or special purpose computing device executing a general or special purpose operating system and one or more software applications. Server 150 can communicate with clients, e.g., client 110 via the same or similar communication channels described above with respect to client 110.

Figure 2:
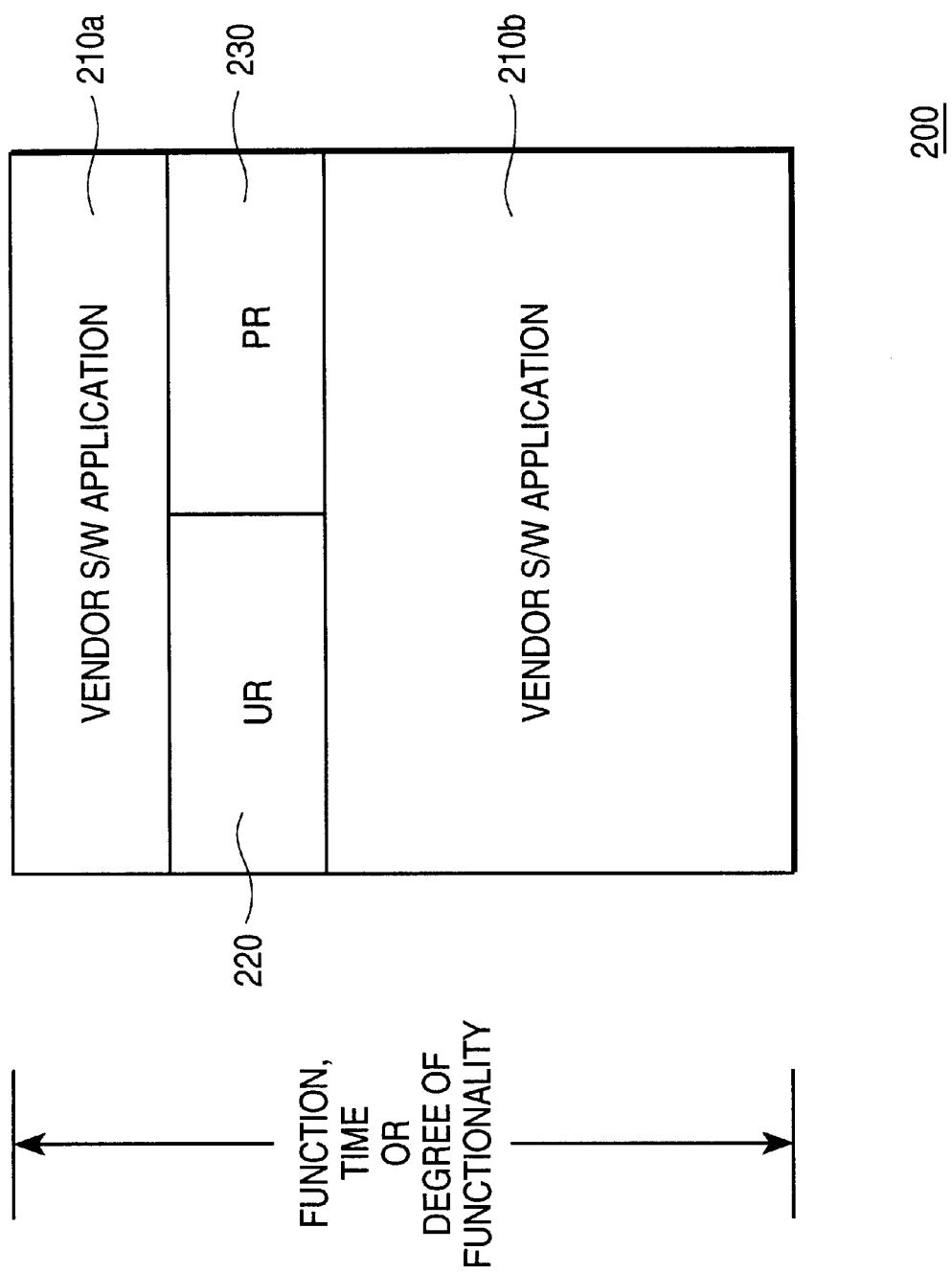
FIG. 2 is a block diagram illustrating a functional or temporal allocation of modules comprising a vendor software application as may be utilized in an embodiment of the present invention.

With reference to FIG. 2, client 110 executes at least one vendor software application 200. According to the preferred embodiment, vendor application 200 is executed locally by a processor within client 110. However, it is understood by those of ordinary skill in the art that vendor application 200 may be accessed and/or executed remotely on server 150, or another server (not shown), according to well known procedures for such execution in the client-server computing environment 100. Additionally, the vendor application, or portions or modules thereof, may be executed in a distributed or other well known computing environment.

Vendor software application 200 may comprise multiple modules or routines, for example module 210*a* and 210*b*, where module 210*a* is accessible and may be executed upon installation of the application 200 and module 210*b* is locked and inaccessible upon installation. However, module 210*b* may later be unlocked and executable after payment or some other vendor requirement is provided by the user to the vendor according to the automated procedure embodied by the present invention. The modules may be delineated by, for example, time, function, or degree of functionality. For instance, a user may be allowed to freely access and execute module 210*a* for a period of time, say 30 days, after which time payment must be rendered for access to continue, as represented by module 210*b*, as is common with shareware applications. Alternatively, a user may opt to purchase a portion of a vendor software application or one module in a suite of vendor software applications, say an accounts payable module, at one point in time, and then later purchase another module, say an accounts receivable module. As yet another example, module 210*a* may be a demonstration module providing limited functionality, whereas module 210*b* may be a commercial module providing full functionality. While both modules may be installed together or separately on the client or a computing device accessible by the client, the user can only freely access and execute the demonstration module. The commercial module is accessible only after payment is received by the vendor according to the steps discussed below. Of course, although not shown in FIG. 2, it is understood that multiple modules 210*b* may be installed and initially inaccessible by the user, i.e., locked, until such time as the vendor's requirements for access, i.e., unlocking, are met.

Unlocking software routine 220 is shown embedded between or linking modules 210*a* and 210*b* of vendor software application 200. In the preferred embodiment, the unlocking routine 220 provides a set of Application Programming Interfaces (APIs) via which the vendor can process the locking and unlocking of module 210*b*. By providing a set of APIs that the vendor software application can call, the unlocking routine may be reused by the same or other vendors. While FIG. 2 illustrates the unlocking software routine as embedded in the vendor software application 200, it is understood that the routine may be separate from and externally linked to or called from the vendor software application 200.

Payment software routine 230 is also shown embedded between or linking modules 210*a* and 210*b* of vendor software application 200. As with the unlocking routine 220, the payment routine provides a set of APIs. The vendor can call the APIs to process payment for the module 210*b*, as will be discussed more fully below. In the preferred embodiment, payment routine 230 is separate from but utilized in conjunction with unlocking routine 220 to provide the user with an automated method for unlocking and paying for module 210*b* of the vendor software application.

Figure 3:
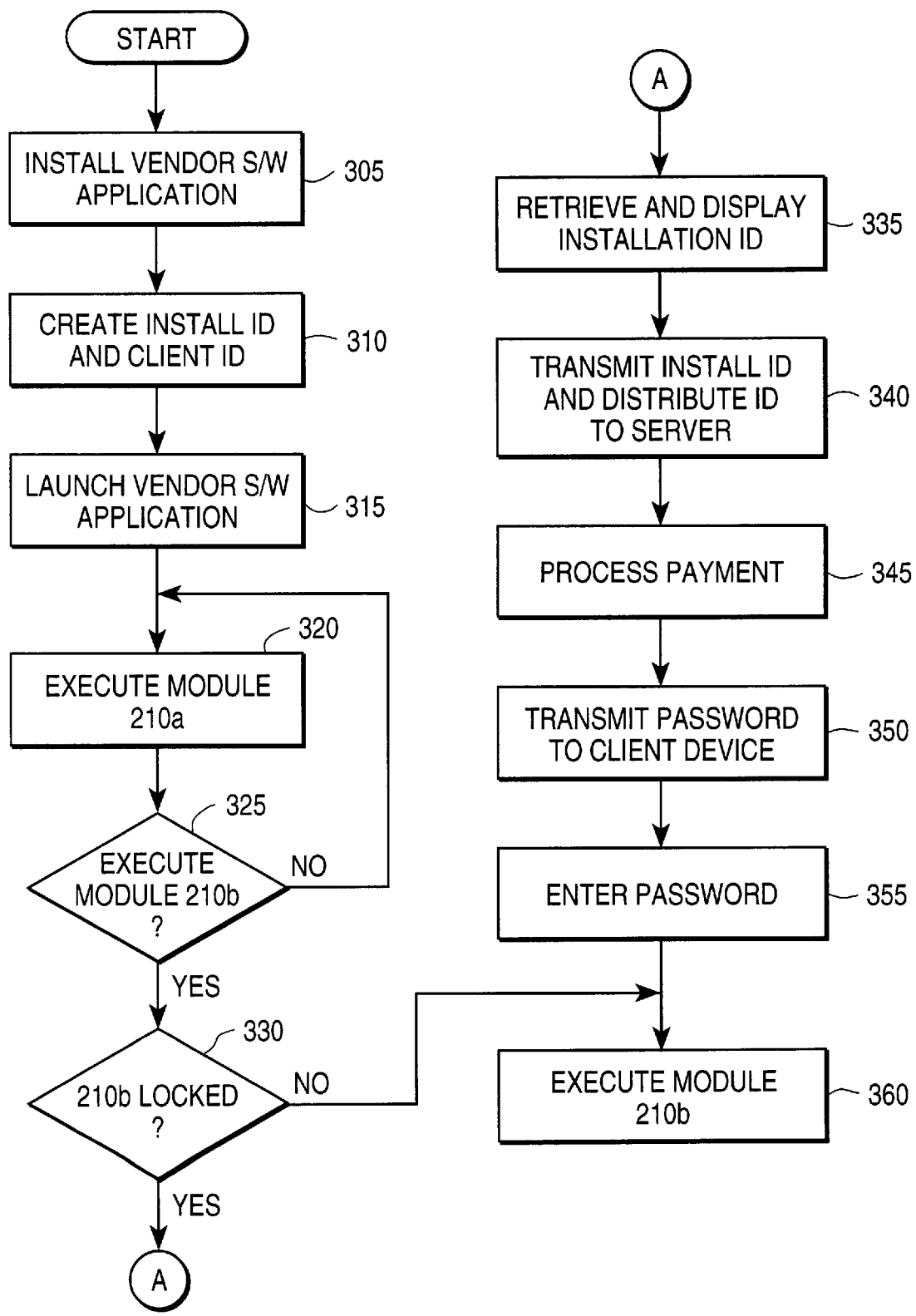
FIG. 3 is a flow diagram of an embodiment of the present invention.

With reference now to FIG. 3, the method for automatically unlocking and paying for at least a portion, e.g., module 210*b*, of the vendor software application 200 is described. A user begins at step 305 by first installing the vendor software application 200, including modules 210*a* and 210*b*. According to one embodiment, at the time the vendor software application is installed, an installation identifier based on the vendor and the client computing device is created and stored at step 310 for later access by the client computing device. The installation identifier may be stored in the client computing device, a peripheral device or computing device accessible by the client computing device, e.g., in permanent nonvolatile memory, on magnetic or optical media, or other forms of permanent storage media. The installation identifier is once defined but may be used many times for separate products from a given vendor. Additionally, as will be described in more detail below, a client device identifier, which is related to the installation identifier, and based on the client computing device, is created and stored in the same manner as the installation identifier. According to a second embodiment, the installation and client identifiers are created and stored at or after the time the user attempts to execute a locked module. According to yet another embodiment, the identifiers may be created and stored after the module has been unlocked and payment received therefor.

Application 200 is then launched at step 315. For example, given a PC operating under the Microsoft Windows™ operating system, a user might select application 200 for execution by double clicking with an input device such as a mouse on an icon in a window, wherein the icon represents an executable file for the vendor software application. In one embodiment, module 210*a* begins executing at step 320, and as a next step at 325, module 210*a* determines whether module 210*b* is to be executed, according to further user input. For example, if a user selects an icon representing module 210*b*, then module 210*a* determines module 210*b* is to be executed. At step 330, module 210*a* determines whether module 210*b* can be executed, i.e., whether module 210*b* is locked. If the module is unlocked, it can be immediately executed at step 360.

If, however, the module 210*b* is locked, it cannot be executed without first processing payment for the module and providing a password for the module. In particular, module 210*a* calls the unlocking software routine 220 to determine whether the user previously purchased module 210*b*. The unlocking software routine 220 determines whether the user previously purchased module 210*b* by searching for a password for module 210*b*. The password is either stored in or accessible by client computing device 110, the presence of which indicates payment has already been received for module 210*b*, as will be apparent from the discussion below. If module 210*b* is not locked, i.e., if a password is detected for module 210*b*, then module 210*a* automatically starts executing module 210*b* at step 360, and no further interaction with the unlocking routine 220 is required.

It will be understood by those of ordinary skill in the art that the module 210*b* may be packaged in a separate executable file or integrated with module 210*a*, with access to restricted portions of the vendor software application 200 controlled in either case by whether module 210*b* was purchased as determined by the presence of a password for module 210*b*. Additionally, while the embodiment described above executes module 210*a*, which in turn, determines whether to execute module 210*b* with the help of unlocking module 220, it is understood that either module 210*a* or 210*b* may be executed, but not necessarily both, as in the case where 210*a* represents a demonstration module and module 210*b* represents a fully functioning module. Furthermore, in an alternative embodiment, the executing module 210*a* may first determine whether module 210*b* is locked, and if not, then determine whether to execute the module.

If module 210*a* begins executing at step 320, receives input at step 325 to execute module 210*b*, and determines, in conjunction with unlocking routine 220 at step 330 that module 210*b* is locked, then payment routine 230 is called so that the user can purchase the software, receive a password for executing the module 210*b* and then begin executing the module. Alternatively, according to another embodiment, steps 325 and 330 may be reversed. For example, if module 210*a* begins executing at step 320 and determines at step 325 that module 210*b* is locked, then module 210*a* provides the user with the choice of whether to execute module 210*b* at step 330. In either embodiment, module 210*a* determines whether module 210*b* is locked by calling the unlocking software routine 220. Module 210*b* is locked if payment has not been received for the module. Unlocking routine 220 determines that module 210*b* is locked and that payment for the module has not been received if there is no password stored in or otherwise accessible by the client computing device. If the module 210*b* is locked, the unlocking routine indicates such to the module 210*a*. A user interface screen is displayed by module 210*a* on a display device associated with the client computing device providing instructions to the user for activating, i.e., unlocking, the module 210*b*.

An example of the steps described thus far is now provided for a vendor software application having both a demonstration software module and a fully functioning commercial software module. The example assumes the vendor software application has already been installed on the client 110 to whatever degree chosen by the vendor. In a PC/ Microsoft Windows™ environment, a user double-clicks on an icon representing the executable file for a vendor software application, which may appear either within the installation directory or as a shortcut on the desktop. The executable file is called demo_mod.exe and is the demonstration version (i.e., demonstration software module) of the vendor software application supplied by the vendor. The first operation performed by demo_mod.exe is to call the API for the unlocking routine 220 to determine whether the user previously purchased the fully functioning version (i.e., commercial software module) of the vendor software application. If so, then demo_mod.exe automatically starts full_mod.exe, which is the commercial software module of the vendor software application, and no further interaction with the unlocking routine API is thereafter required.

If demo_mod.exe determines that an appropriate password is not stored in or accessible by the client computing device, demo_mod.exe displays buttons labeled Preview and Purchase. If the user clicks on Preview, then demo_mod.exe continues executing. If, however, the user clicks on Purchase, then demo_mod.exe starts the payment routine 230. When the user purchases the fully functioning commercial software module full_mod.exe, a password for full_mod.exe is stored in the client computing device or a permanent nonvolatile storage location accessible by the client computing device, so that subsequent invocations of the vendor software application cause the full_mod.exe software module to be executed, via demo_mod.exe.

At step 335, the payment routine displays on a display device associated with the client computing device a telephone number, generally a toll-free 800 or 888 telephone number, for the user to call to access the server 150. In addition, the payment routine conveys the purchase price of module 210*b*, payment options and instructions, and prompts the user to enter the installation identifier, and the vendor software product distribution identifier. (Recall the installation identifier, based on the client computing device and vendor, was stored in the client computing device or the like at the time the vendor software application was installed. The installation identifier is retrieved at step 335 and displayed on the display device when the payment routine is invoked and the user is provided with instructions for processing payment for module 210*b*).

In response to the prompts displayed on the display device associated with the client computing device, the user inputs the installation identifier displayed on the display device, as well as the vendor software product distribution identifier, or simply, product distribution identifier. The product distribution identifier may be, for example, printed on a label affixed to a Compact Disc (CD) case in which a compact disc media storing the vendor software application is shipped. In one embodiment, at step 340, the installation identifier and product distribution identifier are transmitted to the server via a telephone transmission initiated by the user via touch tone input at telephone 105. In an alternative embodiment, installation identifier and product distribution identifier are supplied by the user via an input device, such as microphone 109 or a keyboard associated with the client computing device and transmitted to the server over the Internet 125 or World Wide Web.

The server 150 may be configured, maintained and operated by a third party other than the vendor. For example, vendors may outsource the automated method of unlocking and paying for their software applications as contemplated by the present invention to a third party. The toll-free 800 or 888 telephone number that the user dials when accessing the server for purposes of unlocking and paying for a vendor's software application serves as an index to the third party indicating one of perhaps multiple vendors for which such services are being provided by the third party.

A database on the server 150 maintains information regarding at least one vendor, as is the case when the vendor maintains the server, or multiple vendors, in the case where vendors outsource the unlocking and payment processing to a third party. In the latter case, separate tables are maintained per each vendor, in which are stored installation identifiers and product distribution identifiers. When an installation identifier and product distribution identifier are provided by a user to the server, the appropriate vendor table in which to search for such identifiers is located in the database according to, for example, the toll free number dialed by the user. If the installation identifier and product distribution identifier are located in the appropriate vendor table, the server produces a password, or unlocking key, and passes the same to the client computing device at step 350, after payment for the application has been processed at step 345, as discussed in below.

At step 345, the user has input the product distribution and installation identifiers, and the server looks up the pricing information related to the vendor software product identified by the two identifiers. The pricing information is confirmed to the user. User prompting and input regarding credit card information, e.g., credit card number, type, and expiration, is transmitted via an automated Interactive Voice Response (IVR) system utilizing touch tone techniques with telephone 105, or alternatively, via an Internet session or the like between the client 110 and the server 150.

After payment for the module has been processed, a password generation routine executing on the server takes the product distribution identifier and installation identifier and creates a unique password through a mathematical routine. The mathematical routine varies uniquely by client and product such that different passwords are generated for different software products for a particular vendor.

The password may be communicated to the client computing device by any one of a number of means, including but not limited to a data communications link with the client 110, such as the Internet 125, including a World Wide Web, FTP or Telnet session, or a telecommunications link utilizing, for example, Interactive Voice Response (IVR) technology in connection with telephone 105 and corresponding touch tone or DTMF tone techniques, the important point being that the method for providing the password is entirely automated—no interaction with a telephone service representative is required. In one embodiment, an additional step of checking the password against an expiration date associated with the module is performed. The expiration date could be prompted to and input by the user as part of the unlocking or payment processing routines, or stored either at the client or server at installation or attempted execution, and retrieved as part of the unlocking or payment processing routines.

For reinstallation of a software module, a public version of the password, along with an associated expiration date, is stored in or accessible by the client computing device, for example, in a ASCII file, so that it may be viewed by the user. Given that there is a configurable number of times that the user can attempt to unlock a locked software module, the public password does not present a security threat.

Figure 4:
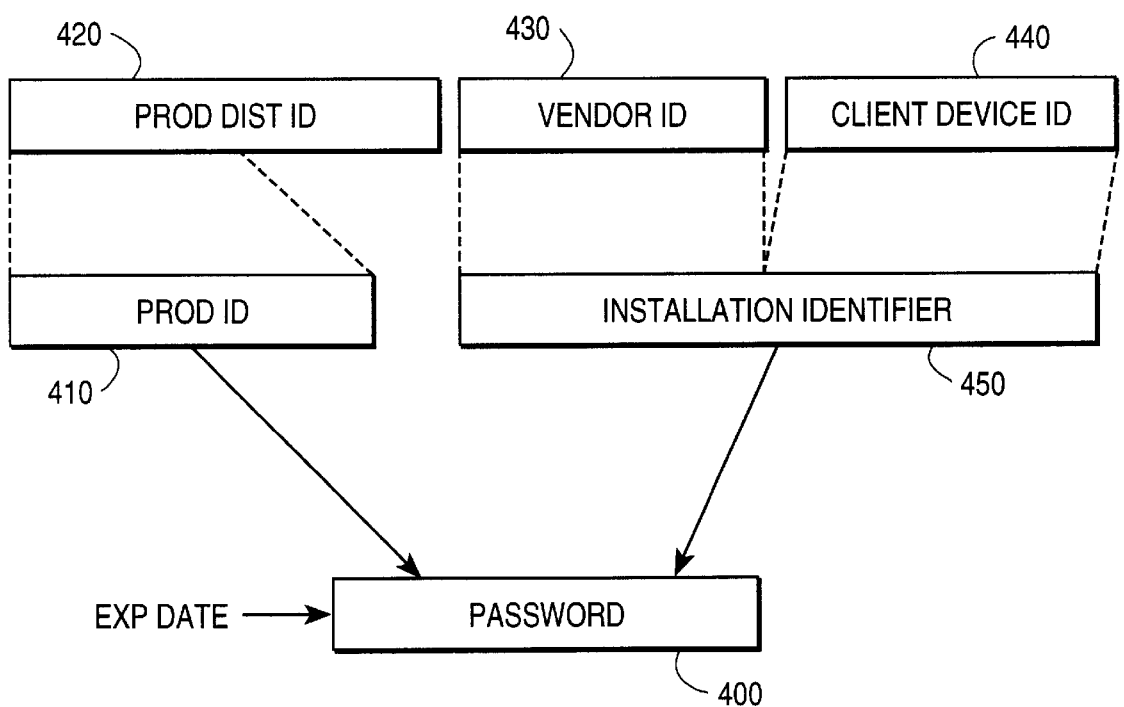
FIG. 4 is a diagram of the elements comprising the password generated according to an embodiment of the present invention.

With reference to FIG. 4, the password 400 created and transmitted by the server 150 to the client computing device 110 is derived from a number of different identifiers and procedures. The product distribution identifier 420, described above, is vendor specific and application software product specific. Thus, it provides, in part, the identity of the product being unlocked or activated, and provides the ability to track the number of software applications distributed (on, for example, CDs) and successfully activated from multiple distributors at multiple locations. Thus, as is shown in FIG. 4, the product distribution identifier 420 comprises at least a product identifier 410 that identifies a particular software vendor's application software product. For example, different versions of the same product may have different product identifiers.

Additionally, the product distribution identifier 420 may comprise a distribution identifier, a location identifier, and a checksum (none of which are shown in FIG. 4). The distribution identifier may indicate, for example, a particular build or compilation of the software application, or distribution channel. The location identifier may identify the geographical location to which the software application (as stored, for example, on permanent storage media such as a CD) was shipped, either by itself or as a unit in a lot or block shipment. The product distribution identifier thus provides the ability for a vendor to track any number of products according to any number of distribution methods.

The installation identifier 450, from which the password is also partly derived, comprises a vendor identifier 430 and a client computing device identifier 440, or simply, client identifier 440. The vendor identifier 430, of course, identifies the vendor that is selling or licensing the software application for which the password is being provided. The client computing device identifier 440 identifies the particular machine or computing device on which the vendor's software application has been installed, and is hidden from the user. The client identifier can be created and stored in the client computing device at the same time the installation identifier is stored, i.e., when the vendor software application, or relevant portion thereof, such as module 210b, is installed on the client computing device. Just as is the installation identifier, the client identifier is machine dependent—i.e., it is based on the client computing device or combination of the client computing device and vendor. At run-time, the password and client identifier are checked to verify that they correspond correctly. If they do, the application or module, whatever the case may be, can be executed.

There is a mathematical relationship between the password and client identifier. However, encryption is utilized to secure the client identifier to the password, so that the relationship between the client identifier and password is obscured. The encryption involves a multi-step process: the installation identifier is derived through encryption of the client identifier; the installation identifier is then encrypted; and the password then derived in part through the encrypted installation identifier.

With reference again to FIG. 3, at step 355, upon receiving the password from the server, the payment routine displays the password on the display device attached to the client computing device and prompts the user to enter the password to activate the application 210b. The user then enters the password, by one of various means, including keyboard, microphone 109 or telephone 105 input. The password is then verified by the payment routine. If the password is verified, the payment routine transfers control to the application 210b at step 360. Optionally, the payment routine transfers control to module 210a or 210b, either of which calls the unlocking routine to verify both payment for and authorization to use the module 210b. If the password is determined to be incorrect by the unlocking routine (e.g., through incorrect data entry on the telephone keypad or input device for the client computing device), an error message is displayed on the display device. Some number of attempts to unlock the module 210b, e.g., three, is provided, after which the user is prevented from further attempts, e.g., to prevent tying up an IVR port on the server, or prevent a hacker from attempting many possible combinations of product distribution and installation identifiers. In the embodiment utilizing the IVR system, once module 210*b*, or full_mod.exe in our example above, is activated, the user hangs up from the IVR. The IVR system records the activation that just transpired, including logging such information as the date, time, product distribution and installation identifiers, password, user's telephone number, credit card number and expiration date, dollar amount charged to the card, and bank authorization.

Once a customer has paid for a particular module, e.g., module 210*b*, that same module may be installed on another computing device by reinstalling the vendor application software on the other computing device, providing the installation and product distribution identifiers as input and transmitting the same to the server. The server then checks for payment and verifies the identifiers and provides a new, unique password that allows the same module, e.g., module 210*b*, to be executed on the additional computing device. The server can be configured to provide vendors with the ability to provide a selectable number of installations. An audit record logs the number of installations. In one embodiment, when the number of installations selected has been reached, control can transfer to a telephone service representative for inquiry, prevention, etc.

Thus, an automated method for software unlocking and payment processing to allow execution of the software by a user on a client computing system in a client-server computing environment is disclosed.

What is claimed is:

1. An automated method for a user to access a vendor software application on a client computing system, comprising:

requesting access to at least a portion of the vendor software application;

if access is allowed, then executing the portion of the vendor software application on the client;

if access to the portion of the vendor software application is not allowed, then:

if access to the portion of the vendor software application is not allowed, then:
      transmitting to a server, a product distribution identifier and an installation identifier, the installation identifier based at least in part on a vendor identifier and a client identifier;
      transmitting to the user, a password generated by the server and derived at least in part from both the product distribution identifier and the installation identifier; and
      supplying the password to the vendor software application to gain access to the portion of the vendor software application.

2. The method of claim 1, further comprising:
   transmitting to the user, pricing information related to the portion of the vendor software application identified by the product distribution identifier; and
   transmitting to the server, payment information necessary to access the portion of the vendor software application.

3. In a client-server computing environment, a computer implemented method for obtaining payment and unlocking a locked software application module for access by a client computing device, comprising:
   requesting at the client computing device, user input necessary for processing payment for the locked module in response to received user input requesting execution of the locked module;

receiving at the client computing device, user input necessary for processing payment for the locked module;
   transmitting to a server, the user input necessary for processing payment for the locked module;
   receiving from the server, an installation identifier based at least in part on a vendor identifier and a client identifier;
   receiving at the client computing device, user input including the installation identifier and a product distribution identifier associated with the locked module; and
   receiving from the server, a password derived at least in part from the installation identifier and the product distribution identifier received at the client computing device.

4. The method of claim 3, wherein requesting user input at the client computing device necessary for processing payment for the locked module in response to the user input requesting execution of the locked module comprises:
   requesting a credit card type;
   requesting a credit card number; and
   requesting a credit card expiration date.

5. The method of claim 4, wherein receiving user input at the client computing device necessary for processing payment for the locked module comprises:
   receiving the credit card type;
   receiving the credit card number; and
   receiving the credit card expiration date.

6. The method of claim 5, wherein receiving the credit card type, number and expiration date comprises the steps of receiving the credit card type, number and expiration date via and interactive voice response system.

7. The method of claim 5, wherein receiving the credit card type, number and expiration date comprises the steps of receiving the credit card type, number and expiration date via a client-server network.

8. The method of claim 5, wherein receiving the credit card type, number and expiration date comprises the steps of receiving the credit card type, number and expiration date via a connection oriented session over an intranet.

9. The method of claim 3, wherein receiving at the client computing device user input including the installation identifier and the product distribution identifier associated with the locked module comprises:
   receiving user input of the installation identifier as received from the server; and
   receiving user input of the product distribution identifier, wherein the product distribution identifier is a physical label associated with a software application comprising the locked module.

10. The method of claim 3, wherein receiving from the server, a password derived at least in part from the installation identifier and the product distribution identifier received at the client computing device transmitting the password to the client computing device to unlock the module, comprises storing the password in a permanent storage medium accessible by the client computing device so that subsequent requests to execute the module are granted based on the presence of the password.

11. A set of Application Programming Interfaces (APIs) that may be called by a software application executing on a client computing device in a client server computing environment to obtain payment for and provide access to a locked module of the software application for execution of the module, the set of APIs providing computer readable program means to effect:

receiving user input at the client computing device necessary for processing payment for the locked module;

transmitting the user input necessary for processing payment for the locked module to a server;

providing an installation identifier to the client computing device, the installation identifier based at least in part on a vendor identifier and a client identifier;

receiving user input at the client computing device comprising the installation identifier and the product distribution identifier associated with the locked module;

generating at the server a password based on the installation identifier and product distribution identifier received at the client computing device; and transmitting the password to the client computing device to unlock the locked module, thereby creating an unlocked module that may be executed.

12. The set of APIs of claim 11, wherein providing an installation identifier to the client computing device comprises:

obtaining the client identifier identifying the client computing device;

encrypting the client identifier to create an encrypted client identifier;

obtaining the vendor identifier identifying the software vendor;

combining the encrypted client identifier and the vendor identifier to create an installation identifier;

transmitting the installation identifier to the client computing device; and storing the installation identifier in a permanent storage medium accessible by the client computing device.

13. The method of claim 11, wherein generating at the server a password based on the installation identifier and the product distribution identifier received at the client computing device comprises:

obtaining the product distribution identifier;

extracting a distribution identifier from the product distribution identifier;

obtaining the installation identifier;

encrypting the installation identifier to create an encrypted installation identifier; and combining the encrypted installation identifier with the distribution identifier to create the password.

14. The method of claim 11, wherein the product distribution identifier comprises a distribution identifier and a geographic location identifier.

15. An article of manufacture comprising a machine readable medium having a plurality of machine readable instructions stored thereon, wherein the instructions, when executed by a processor, cause the processor to:

receive user input requesting access to at least a portion of a vendor software application installed on a client; and determine if the vendor software application is executable;

if the vendor software application is not executable then:
request from the client, a product distribution identifier and an installation identifier, the installation identifier based at least in part on a vendor identifier and a client identifier;

generate a password based at least in part on both the product distribution identifier and installation identifier, received in response to the request from the client; and transmit the generated password to the vendor software application installed on the client.

16. The article of manufacture of claim 15, wherein the instructions, when executed by a processor, cause the processor to determine if the vendor software application is executable by determining the presence of a vendor software application password stored on the client.

17. The article of manufacture of claim 15, wherein the instructions, when executed by a processor, cause the processor to generate a password by:

obtaining the product distribution identifier;

extracting a distribution identifier from the product distribution identifier;

obtaining the installation identifier;

encrypting the installation identifier to create an encrypted installation identifier; and combining the encrypted installation identifier with the distribution identifier to create the password.

* * * * *